United States Patent [19]

Seul

[11] 4,077,648

[45] Mar. 7, 1978

[54] BICYCLE PROPULSION AND SPEED CHANGE MEANS

[76] Inventor: Man Taik Seul, 633-97, Wolkye-dong, Dobong-ku, Seoul, Korea

[21] Appl. No.: 733,174

[22] Filed: Oct. 18, 1976

[30] Foreign Application Priority Data

Oct. 18, 1975 Korea............................................ 2264

[51] Int. Cl.² .............................................. B62M 1/04
[52] U.S. Cl. .................................... 280/236; 280/255; 74/130
[58] Field of Search ............... 280/236, 237, 253, 258, 280/220, 221; 74/130-135

[56] References Cited

U.S. PATENT DOCUMENTS

| 540,686 | 6/1895 | Price | 280/236 |
| 580,512 | 4/1897 | Sharpneck | 74/134 |
| 1,505,271 | 8/1924 | McNeil | 280/253 |
| 3,414,293 | 12/1968 | Frye | 280/254 |

FOREIGN PATENT DOCUMENTS 280,358  4/1952  Switzerland .......................... 280/253

*Primary Examiner*—Kenneth H. Betts
*Attorney, Agent, or Firm*—M. Ted Raptes

[57] ABSTRACT

The invention relates to a novel propulsion means and first and second speed change means for a bicycle. The propulsion means comprises lever means adapted to be pumped up and down by the operator for driving the rear wheel of a bicycle through the speed change means, a propulsion wheel, and sprocket means.

10 Claims, 11 Drawing Figures

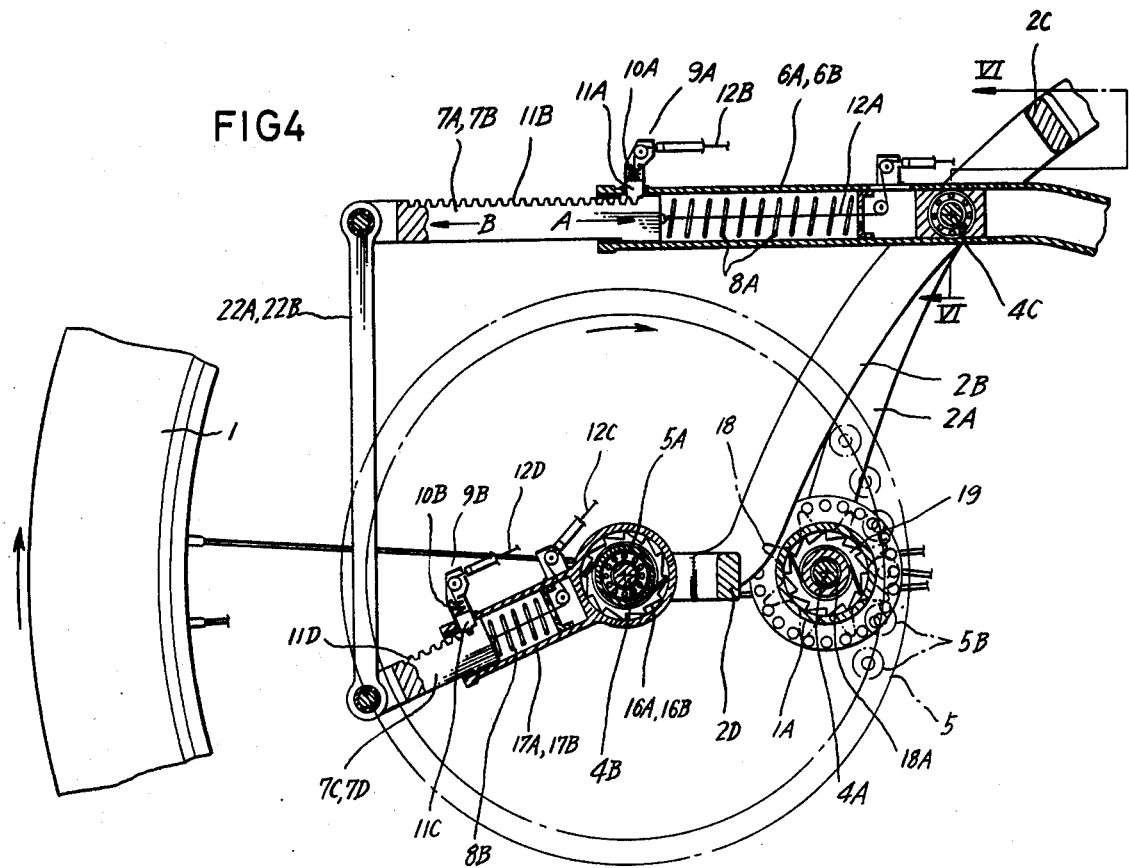
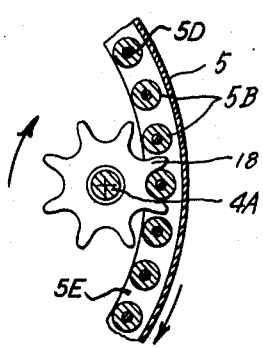
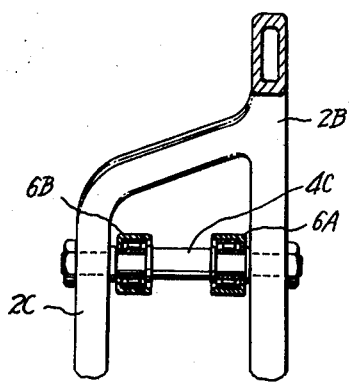
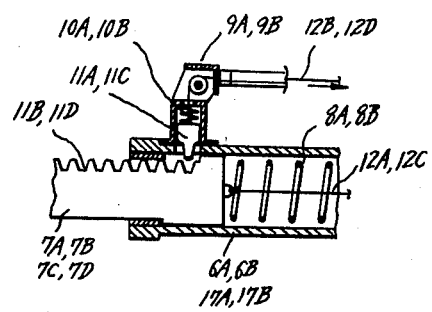

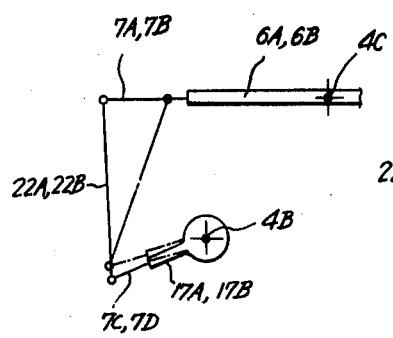
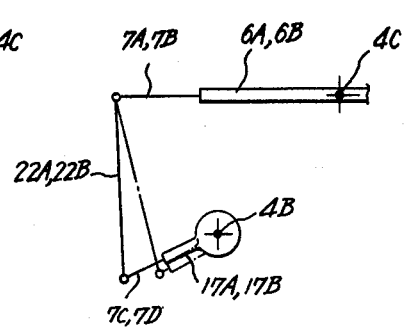
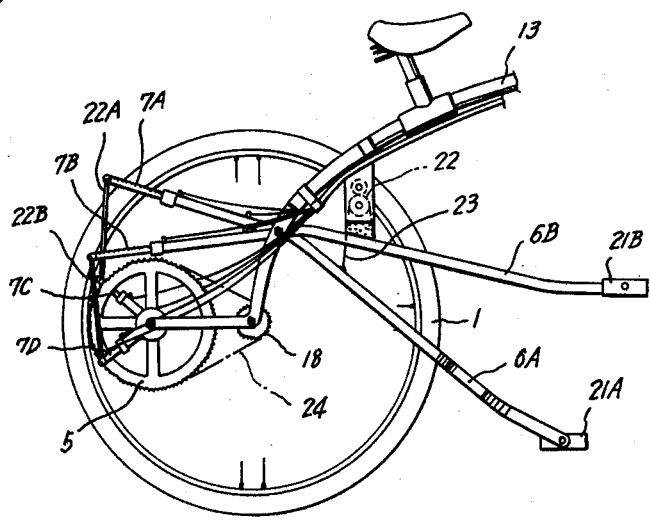
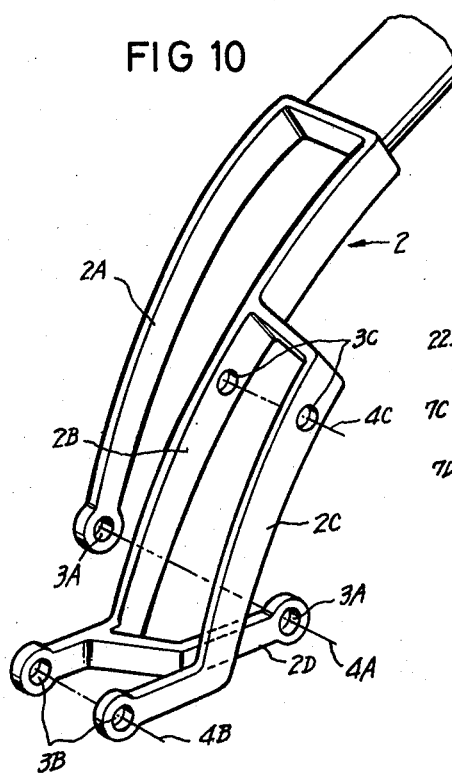

BICYCLE PROPULSION AND SPEED CHANGE MEANS

BACKGROUND OF THE INVENTION

This invention relates to bicycles and more particularly to propulsion means for driving the bicycle and also to speed change means associated with the propulsion means.

Conventional bicycles are driven by pedals connected by cranks to a sprocket which is connected to gear means on the back wheel by a chain drive. The cranks are rotated by the operator and the chain transmits the force to the gear means of the rear wheel to turn the wheel. Thus, when the cranks are turned by means of the pedals, the sprocket and gears are mutually driven at the same time. The changing of gears for speed changes is accomplished with some difficulty and it is necessary to restrain the gear during the change.

The present invention provides a novel propulsion means and speed change means which is easy to attain.

SUMMARY OF THE INVENTION

In accordance with the invention, an improved propulsion means and speed change means are provided for propelling a bicycle. The propulsion means comprises a pair of propulsion levers with pedals which are pumped by the operator in an up and down manner. The levers are mounted on a fulcrum shaft and are provided with a first speed change means comprising bar means and pawl means enabling the levers to be variably lengthened beyond the fulcrum. This first change means permits the bicycle to be operated with less power.

A second speed change means is similar to the first speed change means and is coupled with the first speed change means and provides variable combinations of speed changes with the first speed change means. The second speed change means is adapted to drive a propulsion wheel which in turn drives a sprocket mounted on the axle and hub of the rear wheel thereby driving it.

It is therefore an object of this invention to provide a novel propulsion means and speed change means for selective variable speed propulsion of a bicycle.

Another object of this invention is to provide novel propulsion means for a bicycle wherein propulsion levers are adapted to be pumped up and down by the operator.

A further object of this invention is to provide first and second speed change means for a bicycle adapted to be driven by propulsion levers.

Another object of this invention is to provide a propulsion wheel, adapted to be driven by propulsion levers, and the propulsion wheel is adapted to drive the rear wheel of a bicycle through sprocket means.

Further object and advantages of the present invention will become readily apparent from the following detailed description of a preferred embodiment thereof taken in conjunction with the accompanying drawings.

DESCRIPTION OF THE DRAWINGS

FIG. 4 is a sectional view taken along line IV—IV of FIG. 3;

FIG. 5 is a sectional view taken along line V—V of FIG. 3;

FIG. 6 is a sectional view taken along line VI—VI of FIG. 4;

FIG. 7 is an enlarged fragmentary view, partially in section, showing the details of the first and second change means in composite;

FIG. 8 shows explanatory simplified views of the speed change states wherein FIG. 8a depicts the speed change states obtained by first speed change lever means, and FIG. 8b depicts the speed change states obtained by second speed change lever means;

FIG. 9 is a partial side elevational view of a modification of the propulsion means in accordance with this invention; and FIG. 10 is a partial, perspective view of the rear portion of the frame of the bicycle shown in FIGS. 1 and 2.

DETAILED DESCRIPTION OF THE INVENTION

Figure 1:
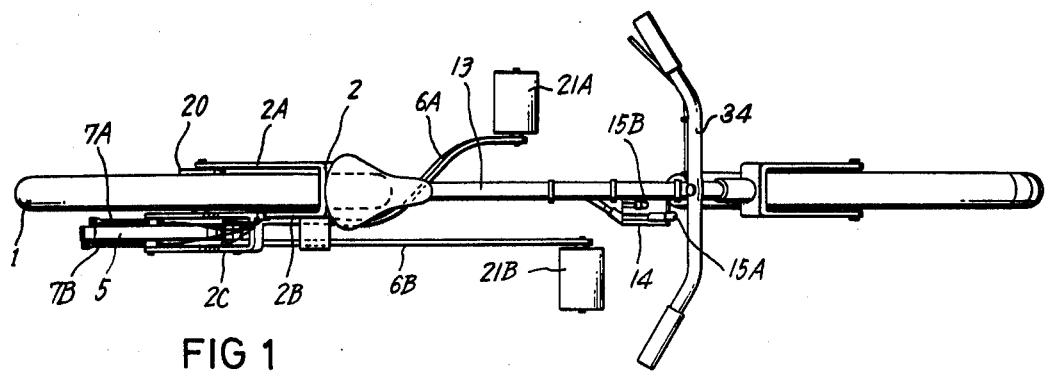
FIG. 1 is a top plan view of a bicycle in accordance with this invention.
Figure 2:
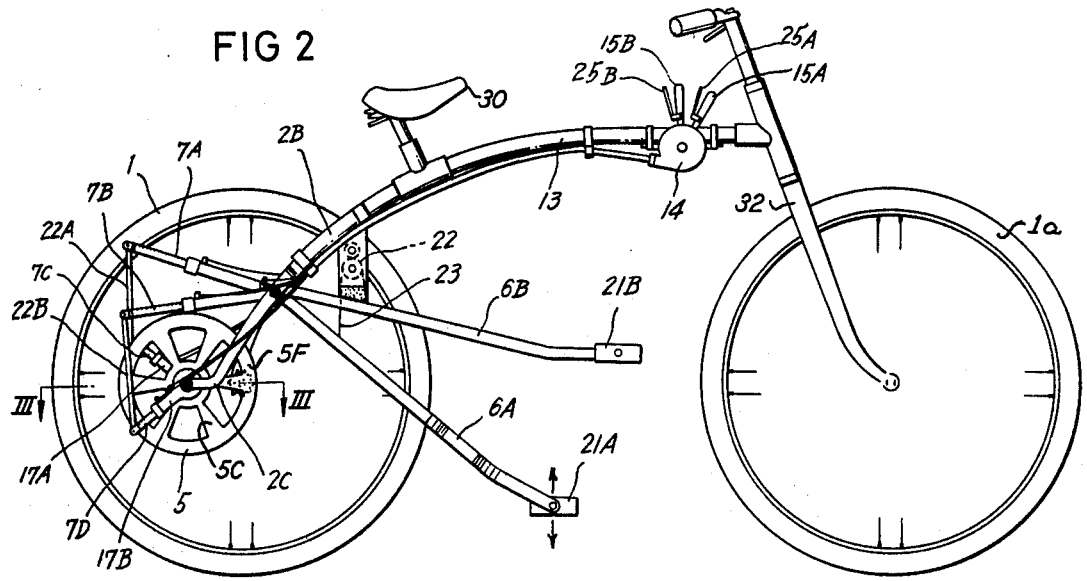
FIG. 2 is a side elevational view of the bicycle shown in FIG. 1.

Referring to the drawings, which illustrate a preferred embodiment of the invention, FIGS. 1 and 2 show a bicycle comprising rear wheel 1, front wheel 1a, main frame section 13, rear frame section generally designated by the numeral 2 (FIG. 10), saddle 30, front fork means 32, and handlebars 34. As will be hereinafter more fully described, the bicycle is propelled forward by the operator by pumping propulsion levers 6A and 6B up and down by foot pedals 21A and 21B, which in turn transmits force through speed change means which provide selective speeds, and a propulsion wheel and sprocket to drive the rear wheel.

The description of the invention is now particularly directed to the construction and configuration of the rear frame section 2 of the frame 13 which comprises two bifurcated portions (FIG. 10). One bifurcated portion comprises companion arm members 2A and 2B, and the other bifurcated portion comprises companion arm members 2B and 2C. An arm member 2D extends forwardly from the bottom of arm member 2B.

Figure 3:
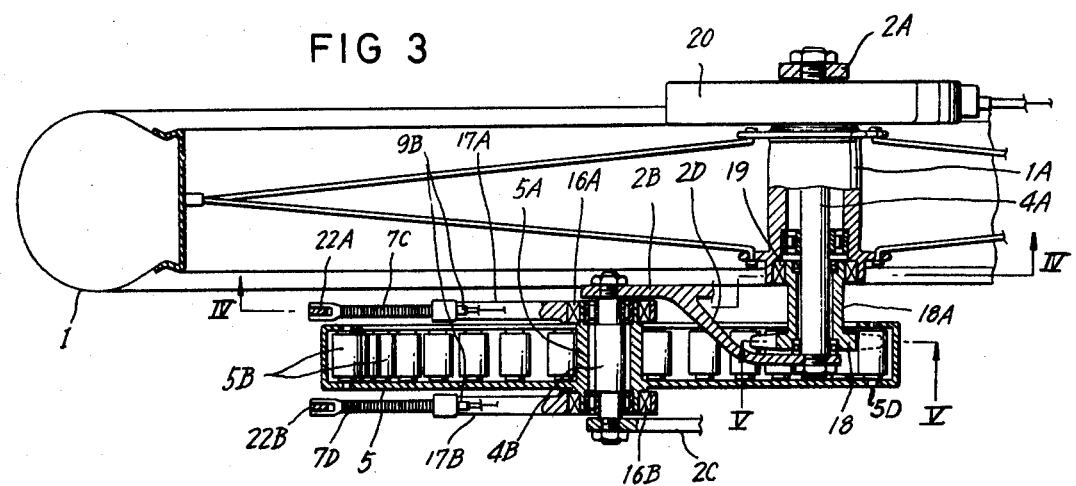
FIG. 3 is an enlarged sectional view taken along line III—III of FIG. 2.

The frame section 2 is adapted to contain the rear wheel 1, propulsion wheel 5, propulsion levers 6A and 6B, and driving levers 17A and 17B. Rear wheel 1 comprises hub 1A with conventional bearings and is mounted on axle 4A, which is disposed through holes 3A of arms 2A and 2D (FIGS. 3 and 10). Propulsion wheel 5 comprises hub 5A with conventional bearings and is mounted on axle 4B which is disposed through holes 3B of arms 2B and 2C. Propulsion levers 6A and 6B are pivotally mounted by means of conventional bearings on shaft 4C, which is disposed through holes 3C or arms 2B and 2C (FIGS. 6 and 10).

The propulsion levers 6A and 6B forwardly of shaft 4C have a front portion angled upwardly with foot pedals 21A and 21B at the ends thereof, thereby providing ease in operation of the pedals. Rearwardly of shaft 4C the levers 6A and 6B have a downwardly angled portion which is hollow and adapted to contain therein first speed change means.

The first speed change means of each of the levers comprises a bar member 7A, 7B with spur teeth 11B adapted to telescope into the rear open end of each lever biased against spring means 8A, and held therein by control means 9A. The control means 9A comprises locking pawl means 11A biased against spring means 10A. Control cable means 12A is connected to the end of the bar member 7A, 7B, and control cable means 12B is connected to pawl means 11A, which control the first speed change means as well be described hereinafter.

Each bar member 7A, 7B is pivotally connected to a second speed change means by arm connecting means 22A, 22B. Second speed change means is similar in construction to the first speed change means, and comprises bar members 7C, 7D (FIG. 4) with spur teeth 11D, which extend into driving levers 17A, 17B, biasing spring 8B, control means 9B comprising stopping pawl 11C and biasing spring 10B, and control cables 12C and 12D, which control the second speed change means as will be described hereinafter.

Driving levers 17A, 17B are adapted to drive propulsion wheel 5, and are rotatably mounted on each side of hub 5A of the propulsion wheel by conventional ratchet and pawl means 16A, 16B, thereby providing driving rotation of wheel 5 in one direction. When levers 17A, 17B are sequentially moved up (clockwise), propulsion wheel 5 is turned clockwise whereas when the levers 17A, 17B are moved down (counter-clockwise), no turning force is imparted to the wheel 5. Thus, wheel 5 can be constantly driven in a clockwise rotation and the inertia of the rotation is not restricted.

Propulsion wheel 5 has an outer side comprised of spoke members 5C connected to hub 5A and outer rim 5F, and an open inner side with rim 5E. A series of roller members 5B are rotatably disposed transversely at spaced positions around the circumference of the wheel 5 on shafts 5D between inner rim 5E and outer rim 5F. The roller members 5B are adapted to engage and drive in a clockwise direction a sprocket member 18, which is disposed between the outer and inner sides of the wheel 5 and has its cogs in engagement with the roller members. Sprocket member 18 is adapted to drive the rear wheel and comprises hub 18A which is rotatably mounted on axle 4A by conventional bearings. The hub 18A is rotatably connected to hub 1A of the rear wheel 1 by conventional ratchet and pawl means 19, whereby the rear wheel can be driven in a clockwise direction. Both the propulsion wheel 5 and the rear wheel 1 are free-wheeling when not being driven.

As shown in FIGS. 1 and 3, conventional band brake means 20 with cable control means can be provided on the opposite side of sprocket 18. The band brake means is shown mounted on axle 4A of the rear wheel by conventional means.

As shown in FIG. 2, means are provided for attaining coordinated, mutual movements of propulsion levers 6A and 6B. Thus, when pedal 21B is moved downwardly by the operator from its topmost position, pedal 21A can be moved upwardly in a mutual counter movement. This is accomplished by providing rollers 22 over which a cable 23 is disposed. One end of the cable is connected to an intermediate portion of lever 6A and the other end to an intermediate portion of lever 6B. The rollers and cable are disposed on a portion of frame 2 on the same side of the bicycle on which the levers are pivotally connected to the rear frame portions 2B and 2C. As seen in FIG. 1, lever 6A is curved around the rear wheel from pedal 21A to the opposite side of the bicycle and on the same side as lever 6B. Accordingly, the up and down movements of the two levers are mutually coordinated by the cable 23, i.e. the downward movement of one lever by the pumping action of the operator also causes the other lever to be moved upwardly.

Frame 13 is provided with speed change control means 14 adapted to operate the first and second speed change means. Control handle 15A operates cables 12A of both bar members 7A, 7B and handle 25A operates cables 12B of both pawls 11A of the first speed change means. Thus, when the first speed change means is to be changed, handle 25A is manipulated and cables 12B release pawls 11A from the teeth 11B of bar members 7A, 7B permitting them to move freely within levers 6A, 6B. Handle 15A can then be manipulated to move the bar members 7A, 7B in the direction of arrow A or in the direction or arrow B with spring 8A providing bias. Accordingly, the length of the levers 6A, 6B can be either lengthened or shortened to provide the appropriate mechanical advantage. The extent of the changes in the first speed change means by the control means 15A is shown schematically in FIG. 8a.

Similarly, control handle 15B operates cables 12C of both bar members 7C, 7D and handle 25B operates cable 12D of both pawls 11C of the second speed change means. When the second speed change means is to be changed, handle 25B is manipulated and cables 12D release pawls 11C from the teeth of bar member 7C, 7D permitting them to move freely within levers 17A, 17B. Handles 25B can then be manipulated to move the bar members into or out of levers 17A, 17B with spring 8B providing bias. Again, the length of the levers 17A, 17B can be either lengthened or shortened to provide the desired mechanical advantage. The extent of the changes in second speed change means by the control means 25B is shown schematically in FIG. 8b.

It can be seen that the variable combination of the first and second speed changes means provides a wide scope of speeds which are available to the operator.

The operation of the bicycle of the present invention will now be described with respect to its mechanical construction. When the operator pumps the pedals 21A, 21B downwardly in sequence, propulsion levers 6A, 6B move up and down on the fulcrum of shaft 4C imparting a force to levers 17A, 17B through connecting arm means 22A, 22B. Movements up and down of levers 17A, 17B impart a clockwise rotary force to propulsion wheel 5 through the ratchet and pawl means 16A, 16B. Propulsion wheel 5 imparts a clockwise rotary force to sprocket 18 and to wheel 1 through ratchet and pawl means 19, whereby the bicycle is moved forwardly.

During the driving of the bicycle, the operator can change the driving speed in accordance with road conditions, e.g. even roads or hills, etc. As previously described, the operator can select a speed at will in accordance with the first and/or second speed change control levers as shown in FIGS. 8a and 8b.

In FIG. 9, a modification of the invention, as previously described, is shown. In this embodiment the propulsion wheel 5 is provided with cogs and is connected to the sprocket 18 also containing cogs, by means of a drive chain 24. All other aspects of this of the embodiment are the same as previously described.

The construction of the bicycle of the present invention provide the following mechanical advantage over conventional bicycles. Because the propulsion levers 6A, 6B are connected to the rear frame 2 containing the rear wheel 1, the length between pedals 21A, 21B and shaft 4C (the fulcrum of the levers) is longer than the length of foot cranks on conventional bicycles. Accordingly, less force is required to pedal the propulsion levers and impart the force to the propulsion wheel and rear wheel. Furthermore, the inertia of the propulsion means does not cease when the pumping of the propulsion levers is temporarily halted, and upon resumption of the pumping of the levers the propulsion force is again transmitted to the rear wheel. Furthermore, by selecting a combination of the first and/or second speed change conditions for the levers 7A, 7B, 17A, 17B the operator can enjoy a suitable driving speed within the wide scope available in accordance with road conditions.

What is claimed is:

1. Propulsion means for a foot-operated bicycle comprising:
    a. rear frame means comprising first and second bifurcated sections;
    b. a pair of propulsion levers pivotally connected in said second bifurcated sections of said rear frame means, said levers comprising pedals for pumping said levers up and down and first speed change means;
    c. rear wheel means and sprocket means rotatably mounted in engagement in said bifurcated section, whereby said sprocket means drives said rear wheel means;
    d. propulsion wheel means rotatably mounted in said second bifurcated section; said propulsion wheel means comprising engaging means to drive said sprocket means;
    e. second speed change means comprising a pair of driving lever means rotatably mounted in said second bifurcated section in engagement with said propulsion wheel means, whereby said driving lever means drive said propulsion wheel;
    f. connecting arm means between said first and second speed change means.

2. The propulsion means of claim 1, wherein said first and second speed change means comprise bar means adapted to telescope into and be retained in said respective propulsion lever means and said driving lever, said bar means of said respective lever means connected together by said connecting arm means.

3. The propulsion means of claim 2, wherein said bar means comprise spur teeth, are biased against spring means, and are controlled by cable means and pawl means, said pawl means controlled by cable means.

4. The propulsion means of claim 1, wherein said driving lever means and said sprocket means are mounted on ratchet and pawl means.

5. The propulsion means of claim 1, wherein said engaging means of said propulsion wheel means comprises a series of of roller members disposed circumferentially on said propulsion wheel and adapted to engage cogs of said sprocket means.

6. The propulsion means of claim 1, wherein said propulsion levers are coordinated in their up and down movement by cable and roller means, said cable means having their ends connected to each of said propulsion levers.

7. The propulsion means of claim 1, wherein said propulsion wheel means drives said sprocket means by endless chain means.

8. The propulsion means of claim 1, wherein said propulsion levers are both disposed on one side of said bicycle and one of said propulsion levers comprises a curved portion containing a pedal adapted to extend to the opposite side of said bicycle.

9. The propulsion means of claim 1, wherein said first and second speed change means are controlled by cable means connected to cable control means disposed on a main frame of said bicycle adjacent the handlebars.

10. Speed change means for bicycle propelled by propulsion levers adapted to be operated up and down by an operator comprising, first bar means adapted to telescope into said propulsion levers, said first bar means comprising first control means for controlling the extent of telescoping of said first bar means, driving levers adapted to indirectly drive a rear wheel of a bicycle, second bar means adapted to telescope into said driving levers, said second bar means comprising second control means for controlling the extent of telescoping of said second bar means, and connecting arm means between said first and second bar means.

* * * * *